(12) United States Patent
Reilly et al.

(10) Patent No.: US 6,400,591 B2
(45) Date of Patent: Jun. 4, 2002

(54) METHOD AND APPARATUS FOR CONVERTING A DC VOLTAGE TO AN AC VOLTAGE

(75) Inventors: David E. Reilly, Concord; Emanual E. Landsman, Lexington; Jeffrey Curtis, Dunstable, all of MA (US)

(73) Assignee: American Power Conversion, West Kingston, RI (US)

(*) Notice: Subject to any disclaimer, the term of this patent is extended or adjusted under 35 U.S.C. 154(b) by 0 days.

(21) Appl. No.: 09/811,974

(22) Filed: Mar. 19, 2001

Related U.S. Application Data

(63) Continuation-in-part of application No. 09/311,043, filed on May 13, 1999.

(51) Int. Cl.$^7$ .............................................. H04M 7/00
(52) U.S. Cl. ......................................... 363/125; 307/66
(58) Field of Search ............................ 363/125, 37, 17, 363/56.01, 56.02, 56.03; 307/64, 66

(56) References Cited

U.S. PATENT DOCUMENTS

| | | | | |
|---|---|---|---|---|
| 5,561,595 A | * | 10/1996 | Smith | 363/37 |
| 5,610,805 A | * | 3/1997 | Gupta | 363/37 |

* cited by examiner

Primary Examiner—Rajnikant B. Patel

(74) Attorney, Agent, or Firm—Mintz, Levin, Cohn, Ferris, Glovsky and Popeo, P.C.

(57) ABSTRACT

Embodiments of the present invention are directed to an uninterruptible power supply for providing AC power to a load. In embodiments of the present invention, the uninterruptible power supply includes an input to receive AC power from an AC power source, an output that provides AC power, a DC voltage source that provides DC power, the DC voltage source having an energy storage device, an inverter operatively coupled to the DC voltage source to receive DC power and to provide AC power. The inverter includes first and second output nodes to provide AC power to the load, first and second input nodes to receive DC power from the DC voltage source, a resonant element having a first terminal and a second terminal, the second terminal being electrically coupled to the first output node, a first switch electrically coupled between the first terminal of the resonant element and the first input node, wherein during a first time period, the first switch is controlled to allow an electrical current path to connect the resonant element to the capacitive element, an electrical current of the path storing energy in the resonant element and charging the capacitive element to a first voltage level, and during a second time period, the first switch is controlled to block the current path to cause the stored energy in the resonant element to further charge the capacitive element to a second voltage level during the second time period. The uninterruptible power supply further includes a transfer switch constructed and arranged to select one of the AC power source and the DC voltage source as an output power source for the uninterruptible power supply.

22 Claims, 11 Drawing Sheets

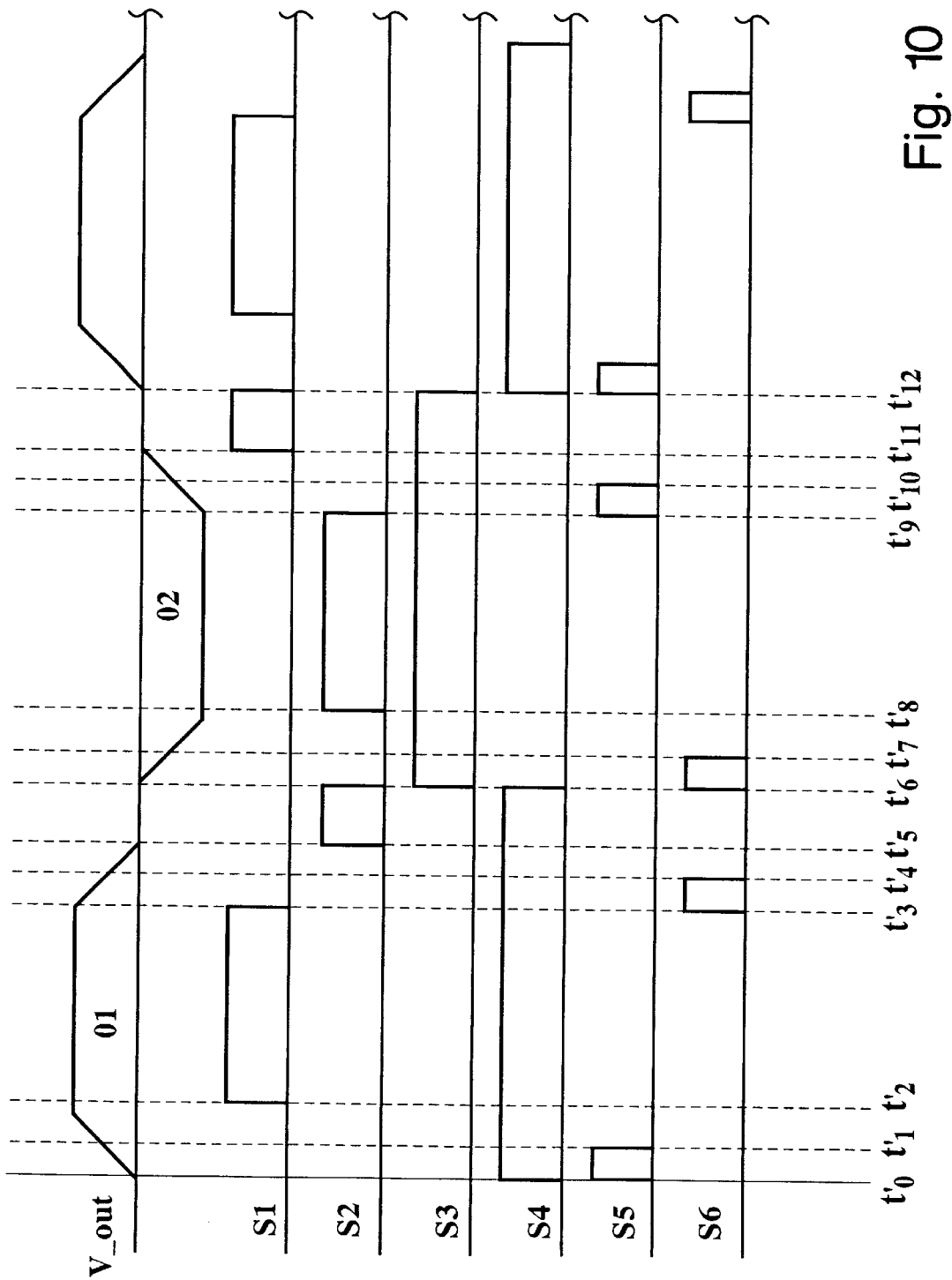

METHOD AND APPARATUS FOR CONVERTING A DC VOLTAGE TO AN AC VOLTAGE

CROSS REFERENCE TO RELATED APPLICATION

This application is a continuation in part of application Ser. No. 09/311,043 titled "Method and Apparatus for Converting a DC Voltage to an AC Voltage," filed on May 13, 1999, which is incorporated herein by reference.

This application is related to an application titled "Excessive Load Capacitor Detection Circuit for UPS," filed on Mar. 19, 2001, which is incorporated herein by reference.

FIELD OF THE INVENTION

Embodiments of the present invention are directed generally to a method and an apparatus for converting a DC voltage to an AC voltage. More specifically, embodiments of the present invention are directed to methods and apparatus for converting DC voltages to AC voltages using resonant bridge inverter circuits in devices such as uninterruptible power supplies.

BACKGROUND OF THE INVENTION

The use of uninterruptible power supplies (UPSs) having battery back-up systems to provide regulated, uninterrupted power for sensitive and/or critical loads, such as computer systems, and other data processing systems is well known. FIG. 1 shows a typical prior art UPS 10 used to provide regulated uninterrupted power. The UPS 10 includes an input filter/surge protector 12, a transfer switch 14, a controller 16, a battery 18, a battery charger 19, an inverter 20, and a DC—DC converter 23. The UPS also includes an input 24 for coupling to an AC power source and an outlet 26 for coupling to a load.

The UPS 10 operates as follows. The filter/surge protector 12 receives input AC power from the AC power source through the input 24, filters the input AC power and provides filtered AC power to the transfer switch and the battery charger. The transfer switch 14 receives the AC power from the filter/surge protector 12 and also receives AC power from the inverter 20. The controller 16 determines whether the AC power available from the filter/surge protector is within predetermined tolerances, and if so, controls the transfer switch to provide the AC power from the filter/surge protector to the outlet 26. If the AC power from the rectifier is not within the predetermined tolerances, which may occur because of "brown out," "high line," or "black out" conditions, or due to power surges, then the controller controls the transfer switch to provide the AC power from the inverter 20. The DC—DC converter 23 is an optional component that converts the output of the battery to a voltage that is compatible with the inverter. Depending on the particular inverter and battery used the inverter may be operatively coupled to the battery either directly or through a DC—DC converter.

The inverter 20 of the prior art UPS 10 receives DC power from the DC—DC converter 23, converts the DC voltage to AC voltage, and regulates the AC voltage to predetermined specifications. The inverter 20 provides the regulated AC voltage to the transfer switch. Depending on the capacity of the battery and the power requirements of the load, the UPS 10 can provide power to the load during brief power source "dropouts" or for extended power outages.

In typical medium power, low cost inverters, such as inverter 20 of UPS 10, the waveform of the AC voltage has a rectangular shape rather than a sinusoidal shape. A typical prior art inverter circuit 100 is shown in FIG. 2 coupled to a DC voltage source 18a and coupled to a typical load 126 comprising a load resistor 128 and a load capacitor 130. The DC voltage source 18a may be a battery, or may include a battery 18 coupled to a DC—DC converter 23 and a capacitor 25 as shown in FIG. 2A. Typical loads have a capacitive component due to the presence of an EMI filter in the load. The inverter circuit 100 includes four switches S1, S2, S3 and S4. Each of the switches is implemented using power MOSFET devices which consist of a transistor 106, 112, 118, 124 having an intrinsic diode 104, 110, 116, and 122. Each of the transistors 106, 112, 118 and 124 has a gate, respectively 107, 109, 111 and 113. As understood by those skilled in the art, each of the switches S1-S4 can be controlled using a control signal input to its gate. FIG. 3 provides timing waveforms for the switches to generate an output AC voltage waveform Vout (also shown in FIG. 3) across the capacitor 130 and the resistor 128.

A major drawback of the prior art inverter circuit 100 is that for loads having a capacitive component, a significant amount of power is dissipated as the load capacitance is charged and discharged during each half-cycle of the AC waveform. This power is absorbed by the switches S1, S2, S3, S4, which typically requires the switches to be mounted to relatively large heat sinks. The issue of power dissipation becomes greater for high voltage systems, in which the energy required to charge the load capacitance is greater. The dissipation of power in the switches dramatically reduces the efficiency of the inverter, and accordingly, reduces the run-time of the battery 18 in the UPS 10. The rise in temperature of the switches also becomes a large concern.

SUMMARY OF THE INVENTION

In one general aspect, the present invention features an uninterruptible power supply for providing AC power to a load having a capacitive element. The uninterruptible power supply includes an input to receive AC power from an AC power source, an output that provides AC power, a DC voltage source that provides DC power, the DC voltage source having an energy storage device, an inverter operatively coupled to the DC voltage source to receive DC power and to provide AC power, the inverter including first and second output nodes to provide AC power to the load having the capacitive element, first and second input nodes to receive DC power from the DC voltage source, a resonant element having a first terminal and a second terminal, the second terminal being electrically coupled to the first output node, a first switch electrically coupled between the first terminal of the resonant element and the first input node, wherein during a first time period, the first switch is controlled to allow an electrical current path to connect the resonant element to the capacitive element, an electrical current of the path storing energy in the resonant element and charging the capacitive element to a first voltage level, and during a second time period, the first switch is controlled to block the current path to cause the stored energy in the resonant element to further charge the capacitive element to a second voltage level during the second time period, a set of switches operatively coupled between the first and second output nodes and the first and second input nodes and controlled to generate AC power from the DC power, and a transfer switch constructed and arranged to select one of the AC power source and the DC voltage source as an output power source for the uninterruptible power supply.

Other features may include one or more of the following: the first voltage level is a portion of a voltage source and the second voltage level is substantially the voltage source; the set of switches includes a second switch electrically coupled between the second output node and the second input node, a third switch electrically coupled between the second output node and the first input node, a fourth switch electrically coupled between the first output node and the first input node, and a fifth switch electrically coupled between the first output node and the second input node; the inverter further includes a sixth switch electrically coupled between the first terminal of the resonant element and the second input node; the resonant element includes an inductor; each of the switches includes a transistor; the energy storage device includes a battery; and the transfer switch is constructed and arranged to receive the AC power from the input and to receive the AC power from the inverter and to provide one of the AC power from the input and the AC power from the inverter to the load.

In another general aspect, the uninterruptible power supply includes an input to receive AC power from an AC power source, an output that provides AC power, a voltage source that provides DC power, the voltage source having an energy storage device, an inverter operatively coupled to the voltage source to receive DC power and having an output to provide AC power, the inverter including means for charging the capacitive element to a first voltage level by creating an electrical current path from the inverter to the load through a resonant element, wherein the resonant element stores energy from an electrical current of the path, means for blocking the electrical current path after the capacitive element has been charged to the first voltage level to cause energy from the resonant element to be transferred to the capacitive element to further charge the capacitive element to a second voltage level, and a transfer switch constructed and arranged to select one of the AC power source and the voltage source as an output power source for the uninterruptible power supply.

Other features may include one or more of the following: the energy storage device includes a battery; the resonant element includes an inductor; and the transfer switch is constructed and arranged to receive the AC power from the input and to receive the AC power from the output of the inverter and to provide one of the AC power from the input and the AC power from the output of the inverter to the load.

In another general aspect, the present invention features a method of supplying an uninterruptible AC voltage to a load having a capacitive element using an uninterruptible power supply having a DC voltage source with an energy storage device. The method comprising steps of charging the capacitive element to a first voltage level by supplying electrical current from the DC voltage source to the load through a resonant element in the uninterruptible power supply, storing energy in the resonant element from the electrical current, blocking the electrical current from the DC voltage source to the load through the resonant element after the capacitive element has been charged to the first voltage level, and transferring the stored energy from the resonant element to the capacitive element to further charge the capacitive element to a second voltage level.

Other features may include one or more of: supplying load current from the DC voltage source to the load after the capacitive element has been charged to the second voltage level, blocking the load current from the DC voltage to the load after a predetermined period, discharging the capacitive element through the resonant element, and transferring energy from the resonant element to the energy storage device in the DC voltage source; receiving an AC voltage from an AC power source, selecting one of the AC power source and the DC voltage source as an output power source for the uninterruptible power supply; and wherein the resonant element includes an inductor.

BRIEF DESCRIPTION OF THE DRAWINGS

For a better understanding of the present invention, reference is made to the drawings which are incorporated herein by reference and in which:

FIG. 10 illustrates alternative timing waveforms for the inverter circuit in FIG. 4.

DETAILED DESCRIPTION

Figure 4:
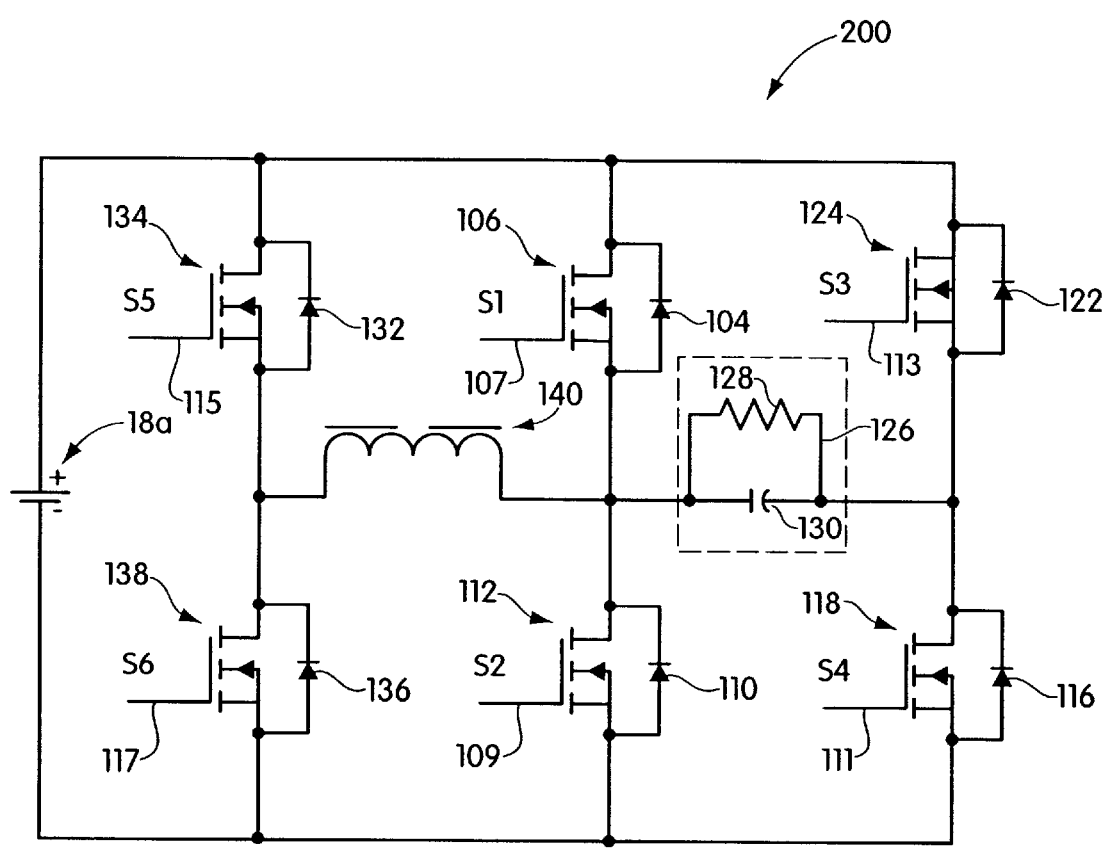
FIG. 4 shows a schematic diagram of an inverter circuit in accordance with one embodiment of the present invention.

One embodiment of an inverter 200 in accordance with the present invention will now be described with reference to FIG. 4 which shows a schematic diagram of the inverter 200 coupled to the voltage source 18a and the load 126. The inverter 200 includes MOSFET switches S1, S2, S3 and S4 of the prior art inverter 100 and includes two additional MOSFET switches S5 and S6 and an inductor 140. In one embodiment, the switches S5 and S6 are similar to switches S1–S4 and include a transistor 134, 138 having an intrinsic diode 132, 136. Each of the transistors 134 and 138 has a gate 115 and 117 that is used to control the state of the transistor.

In one embodiment that provides an output of 120 VAC, 400 VA, 25 amps peak current to the load from an input to the inverter of approximately 170 VDC, the switches S1–S6 are implemented using part no. IRF640 available from International Rectifier of El Segundo, Calif. For 220 VAC applications, the switches may be implemented using part no. IRF730 also available from International Rectifier. The inductor 140, in the 120 VAC embodiment, may be implemented using a 1.8 mH inductor having a very high Bsat value to be able to withstand high peak currents without saturating. In one embodiment, the inductor may be made from an EI lamination structure of M-19, 18.5 mil steel having a large air gap between the E and I laminations. Other values of inductors may be used with embodiments of the present invention depending upon the peak switch current and physical size of the inductor desired. In selecting an inductor for use, the transition time, or time required to charge or discharge the load capacitance, should also be considered to prevent the transition time from becoming either too short or too long. If the transition time is too long, then the pulse width of the output waveform may become too long. If the transition time is too short, the peak switch currents become greater.

Figure 5:
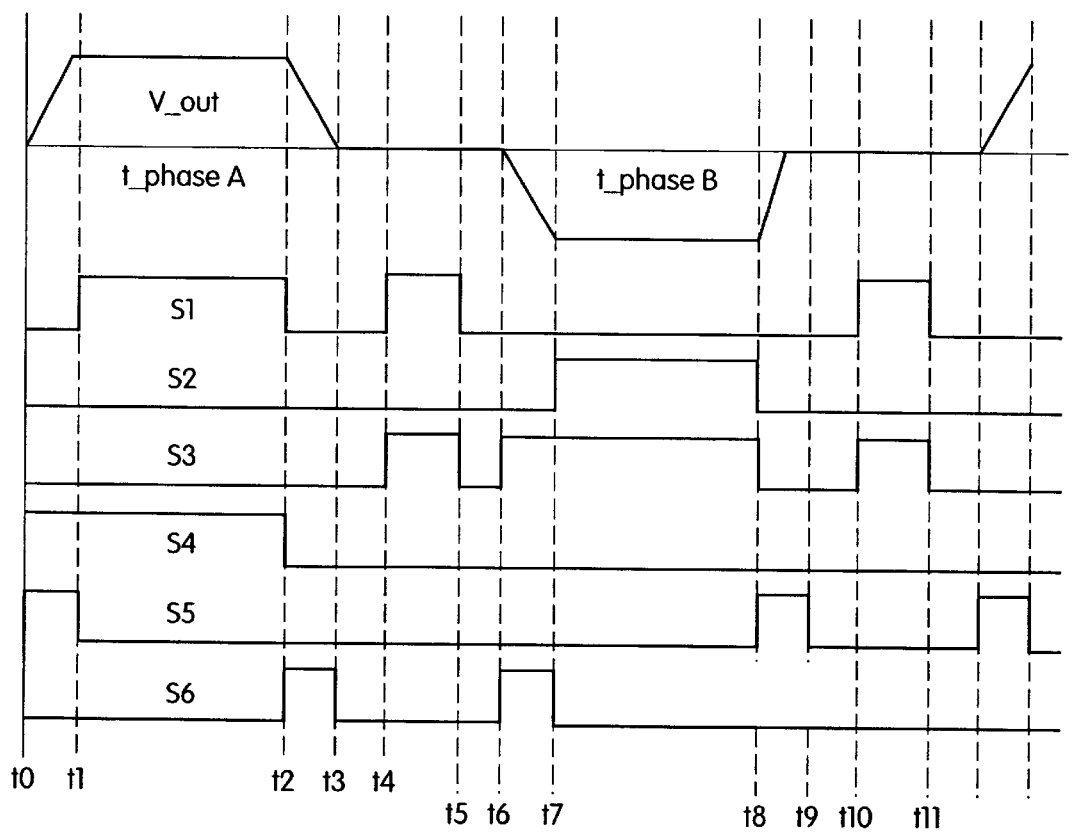
FIG. 5 shows timing waveforms for the inverter circuit shown in FIG. 4.

The operation of the inverter 200 to provide AC power to the load will now be described with reference to FIGS. 5–9. FIG. 5 provides a timing diagram of the operation of the switches S1–S6 of the inverter 200 and also provides the output voltage waveform across the load 126. In the timing diagram of FIG. 5, for each of the switches S1–S6, when the corresponding waveform is in the high state, the switch is turned on (conducting state) and when the corresponding waveform is in the low state the switch is turned off (non-conducting state).

In the inverter 200, the switches are shown as being implemented using NMOS devices. As known by those skilled in the art, for an NMOS device, a control signal having a high state is supplied to the gate of the device to turn the device on (conducting), while a control signal having a low state is supplied to the gate to turn the device off (non-conducting). Accordingly, the timing diagram of each of the switches also represents the state of the control signal provided to the gate of the corresponding transistor. In embodiments of the present invention, the control signals may be provided from, for example, controller 16 of the UPS of FIG. 1 when the inverter is used in a UPS. Alternatively, the control signals may be supplied using timing logic circuits residing within the inverter itself as is known in the art.

Figure 6:
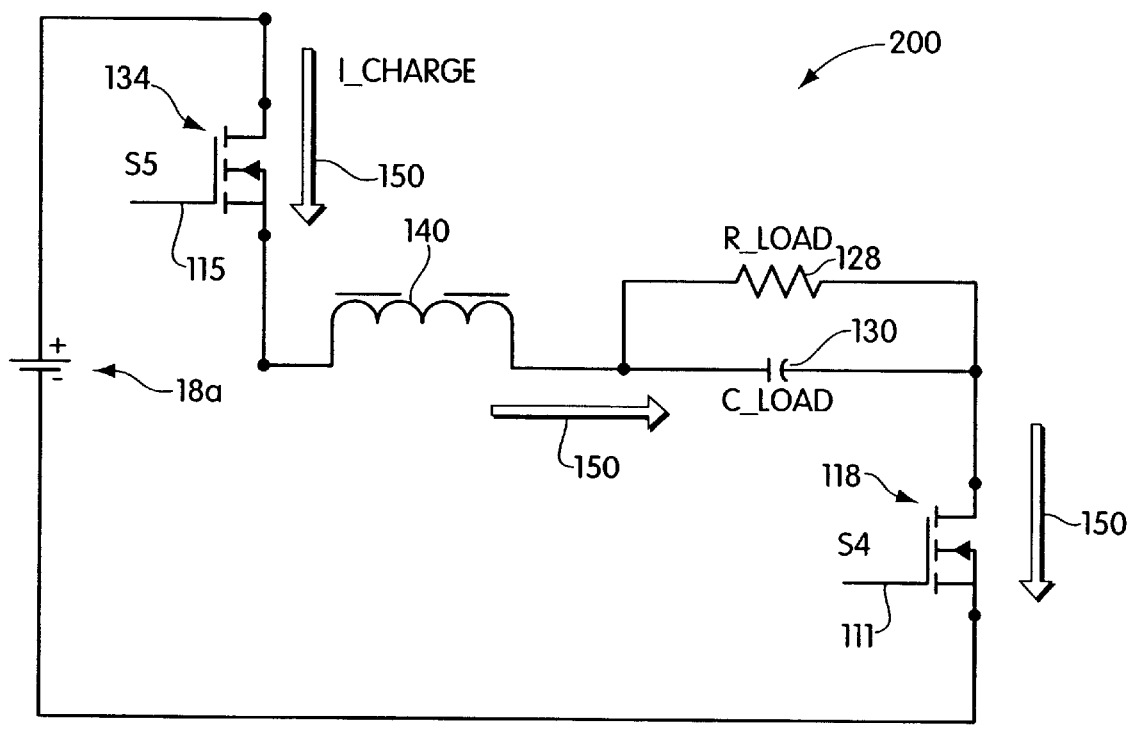
FIG. 6 illustrates a current path through the inverter of FIG. 4 during a charging mode of the inverter corresponding to a starting point of the positive half cycle of the output voltage waveform.

During a first time period from t0 to t1 in FIG. 5, switches S4 and S5 are turned on and switches S1, S2, S3 and S6 are turned off creating a current path through the inverter 200 in the direction of arrows 150 as shown in FIG. 6. Only the components of the inverter 200 in the current path created during the first time period are shown in FIG. 6. As shown in FIG. 6, with switches S4 and S5 turned on, the inductor 140 and the load 126 are connected in series across the voltage source 18a. During the first period, the output voltage across the load Vout rises in a resonant manner from zero volts to the voltage of the voltage source 18a. The output voltage Vout is prevented from rising beyond the voltage of the voltage source by the diode 104 (FIG. 7) of switch S1. The diode 104 will conduct current to limit the output voltage Vout to the voltage of the voltage source.

Figure 7:
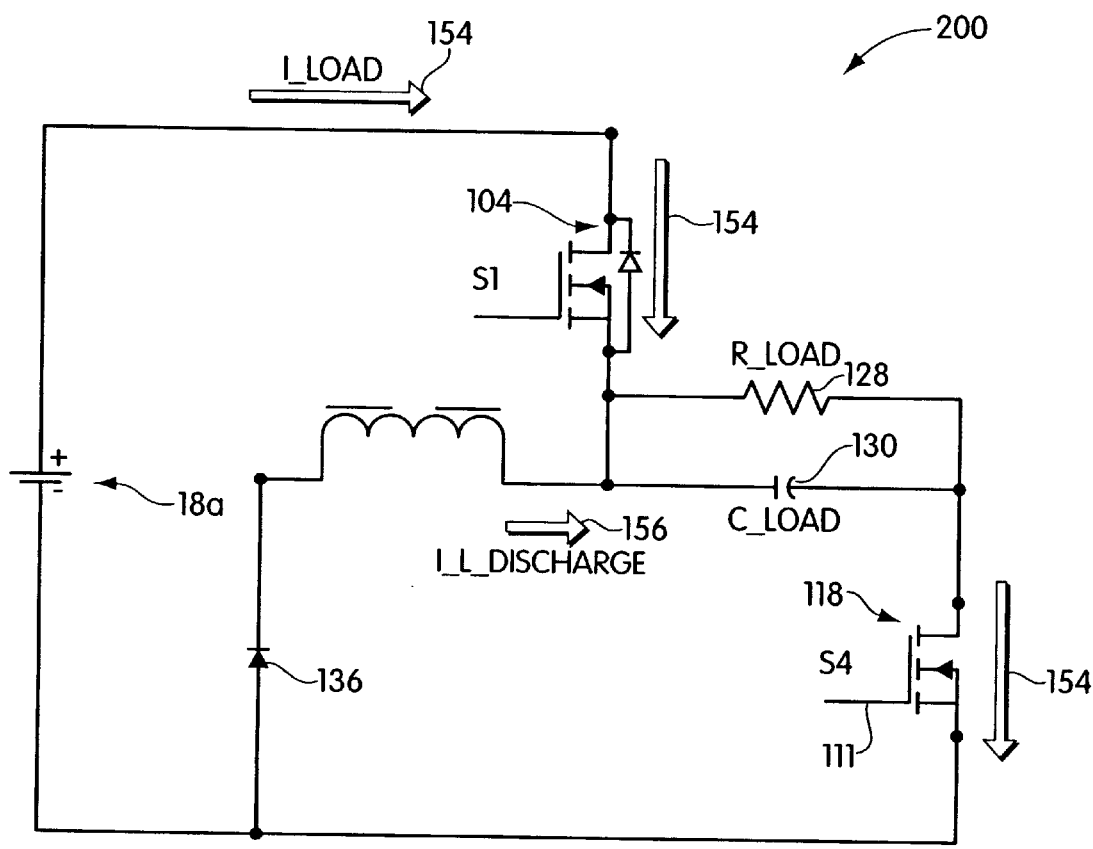
FIG. 7 illustrates a current path through the inverter of FIG. 4 during a positive half cycle of the output voltage waveform.

Once the output voltage Vout reaches the voltage of the voltage source (or shortly thereafter), at time t1, switch S1 is turned on and switch S5 is turned off. Switches S1 and S4 remain on for a second period from time t1 to time t2, during which time, the load is coupled across the voltage source 18a. FIG. 7 shows the current path through the inverter during the second time period. As shown in FIG. 7, load current during the second period follows arrows 154. Also during the second time period, the energy that was stored in the inductor during the first time period causes the voltage across the inductor to reverse and energy in the inductor is released to a storage device in the voltage source, such as a battery or a capacitor, through a current that follows a path along arrow 156 through diode 104 of switch 1 and diode 136 of switch 6. In addition, depending upon the load impedance, current from the energy stored in the inductor may also follow a path through the load.

Figure 8:
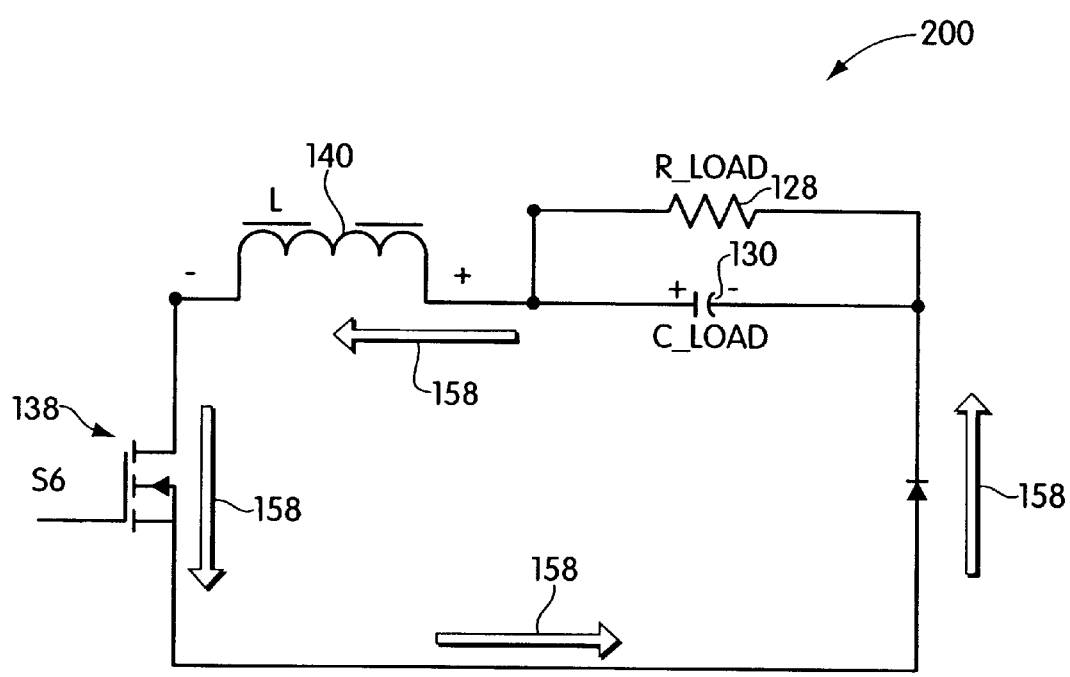
FIG. 8 illustrates a current path through the inverter of FIG. 4 during a discharging mode of the inverter at the end of the positive half cycle of the output voltage waveform.
Figure 9:
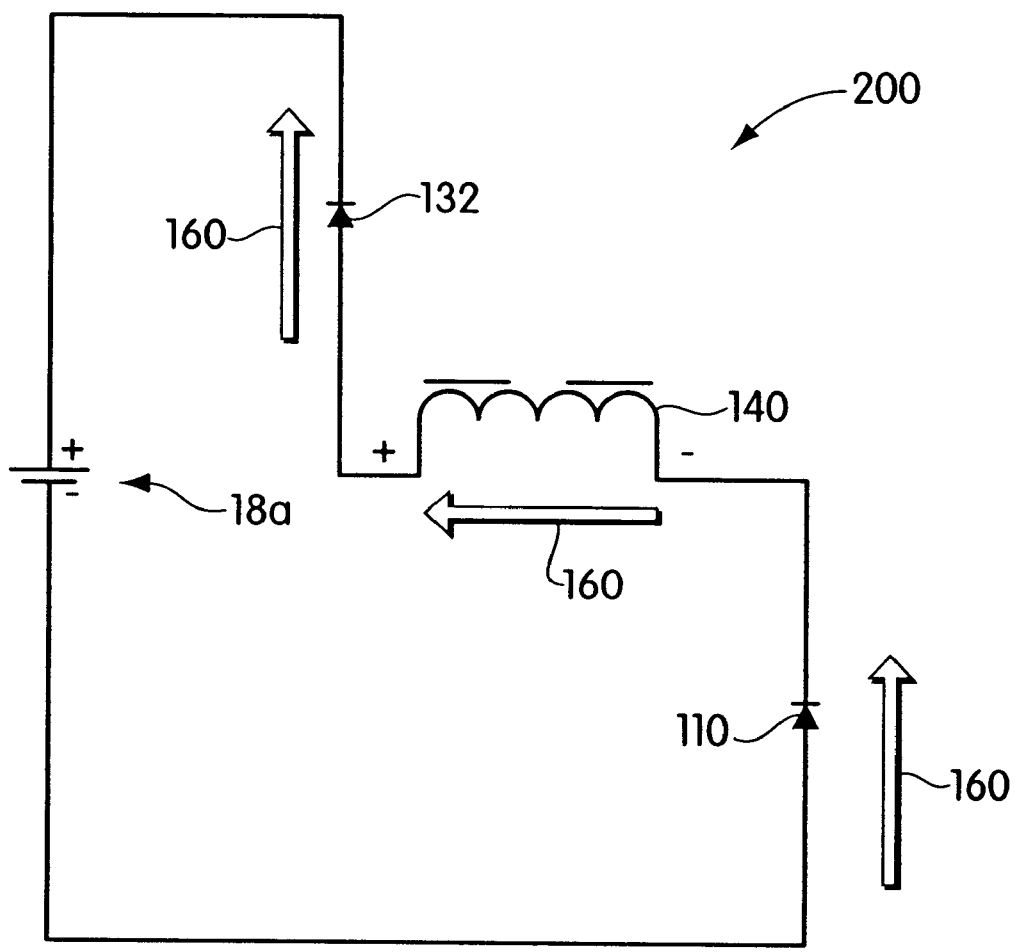
FIG. 9 illustrates a current path through the inverter during an energy recovery mode of the inverter.

During a third time period from time t2 to time t3, the voltage across the load is returned to zero. At time t2, switches S1 and S4 are turned off to disconnect the load from the voltage source and switch S6 is turned on to place the inductor effectively across the load as shown in FIG. 8. During the third time period, energy stored in the load capacitor 130 is transferred to the inductor 140, and the voltage across the load decreases to zero. The output voltage Vout is prevented from going negative by diode 110 (FIG. 9) of switch S2. The diode 110 will conduct current to limit the output voltage to zero.

At time t3 switch S6 is turned off, and all switches remain off during a fourth time period from t3 until t4. The current path through the inverter 200 during the fourth time period follows arrows 160 shown in FIG. 9. During the fourth time period, the energy in the inductor 140 freewheels into the voltage source 18a through diodes 110 and 132 of S2 and S5, and the voltage across the load typically remains at zero. The time from t3 until t4 is normally chosen to be long enough to permit all of the inductor energy to be transferred to the voltage source 18a.

During a fifth time period from t4 to t5, switches S1 and S3 are turned on to maintain a low impedance across the load to prevent any external energy from charging the output to a non-zero voltage. This is referred to as the "clamp" period. At time t5, all switches are again turned off and remain off for a sixth time period until time t6.

Beginning at time t6, and continuing until time t9 the negative half cycle of the AC waveform is created. The negative half cycle is created in substantially the same manner as the positive half cycle described above in connection with FIGS. 5–9, except that switch S3 is substituted for switch S4, switch S6 is substituted for S5 and switch S2 is substituted for S1. The positive and negative half cycles then continue to be generated in an alternating manner to create an AC output voltage waveform.

In the embodiments described above, and in particular with reference to FIGS. 5–7, switch S5 is left on until the load voltage Vout reaches the voltage of the voltage source 18a. At time t1, switch S5 is turned off and as shown in FIG. 7, the energy stored in the inductor 140 freewheels into the voltage source 18a. However, some of the inductor's stored energy also freewheels into the load and bus capacitance resulting in some power loss. In another embodiment of the invention, which will now be described, an alternative timing sequence minimize this power loss. Furthermore, another benefit of the alternative timing sequence is that lower peak and rms current flows through the resonant circuit. Thus, the inductor stores less energy and therefore a lower Bsat value may be used along with a smaller inductor. The alternative timing sequence will now be described with reference to FIG. 10.

With reference to FIG. 10, during a first time period from t'0 to t'1, switches S4 and S5 are turned on and switches S1, S2, S3 and S6 are turned off creating a current path through the inverter 200 in the direction of arrows 150 similar to that shown in FIG. 6. With switches S4 and S5 turned on, the inductor 140 and the load 126 are connected in series across the voltage source 18a. During the first time period, the load voltage Vout rises in a resonant manner from zero volts to a portion of the voltage of the voltage source 18a, preferably, approximately half of the voltage of the voltage source 18a. At time t'1, switch S5 turns off blocking the current path from the voltage source 18a to the inductor 140. During the second time period from t'1 to t'2, the inductor 140 freewheels through reverse diode 136 and the energy stored in the inductor continues to charge the capacitor and increase the load voltage Vout to the voltage of the source voltage 18a. Accordingly, the power loss due to the inductor's stored energy being freewheeled into the bus capacitance is minimized. According to one embodiment, the controller 16 controls appropriate switches such that freewheeling or "swing" time is made approximately equal to the inductor charge time. For example, if the inductor charge time is 100 us the inductor freewheeling time is set at about 100 us. The output voltage Vout is prevented from rising beyond the voltage of the voltage source by the diode 104 (FIG. 7) of switch S1.

Once the load voltage Vout reaches the voltage of the source voltage (or shortly thereafter), at time t'2, switch S1 turns on and switches S1 and S4 remain on for a third time period from t'2 to t'3, during which time, the load is coupled across the source voltage 18a similar to that shown in FIG. 7. At time t'3, switch S1 turns off to disconnect the load from the voltage source 18a and switch S6 turns on to place the inductor effectively across the load similar to that shown in FIG. 8. During a fourth time period from t'3 to t'4, some of the energy stored in the load capacitor 130 is transferred to the inductor 140 and the voltage across the load decreases to approximately half the voltage source 18a, at which time t'4, the switch S6 is turned off. During the fifth time period from t'4 to t'5, with the switch S6 turned off, the inductor 140 freewheels through reverse diode 132 and its stored energy is returned to the voltage source 18a in a manner similar to that shown in FIG. 9 and finishes discharging the load capacitor to zero volts. The output voltage Vout is prevented from going negative by diode 110 (FIG. 9) of switch S2. The diode 110 will conduct current to limit the output voltage to zero.

During a sixth time period from t'5 to t'6, switch S2 turns on and switches S2 and S4 maintain a low impedance across the load to prevent any external energy from charging the output to a non-zero voltage. This is referred to as the "clamp" period. At time t'6, all switches are turned off.

Beginning at time t'6 and continuing until time t'12, the negative half cycle of the AC waveform is created. The negative half cycle is created in substantially the same manner as the positive half cycle described above in connection with FIGS. 4 to 9, except that switch S3 is substituted for switch S4, switch S6 is substituted for S5 and switch S2 is substituted for S1. The positive and negative half cycles then continue to be generated in an alternating manner to create an AC output voltage waveform.

In one embodiment of the present invention, in an inverter designed to generate 50 Hz voltage waveforms, the first time period from t'0 to t'1 is approximately 100 microseconds, the second time period from t'1 to t'2 is approximately 100 milliseconds, the third time period from t'2 to t'3 is approximately 4.8 milliseconds, the fourth time period from t'3 to t'4 is approximately 100 microseconds, the time period from time t'4 to t'5 is approximately 100 microseconds, and the time period from t'5 to t'6 is approximately 4.8 milliseconds. In this embodiment, the negative half cycle of the waveform is symmetric with the positive half cycle, and accordingly, the rise time, fall time and duration of the negative half cycle are approximately equal to those of the positive half cycle.

In embodiments described above, during the clamp period from t'5 to t'6 after a positive half cycle switches S2 and S4 are turned on to clamp the output to a low impedance. During the clamp period from t'11 to t'12 after a negative half cycle, switches S1 and S3 are turned on to clamp the output to a low impedance. In another embodiment of the present invention, following a positive half cycle, switches S1 and S3 are turned on to clamp and after a negative half cycle, switches S2 and S4 are turned on to clamp. This method is less desirable because circulating currents will flow through inductor 140 during the clamp periods, resulting in additional power losses. In a third embodiment during both clamp periods, switches S1 and S3 are turned on to clamp. In a fourth embodiment during both clamp periods, switches S2 and S4 are turned on to clamp.

In embodiments of the present invention, the inverter 200, is used in the manner described above, to create an output AC voltage having the waveform shown in FIG. 10 from an input DC voltage using a resonance circuit. The use of the resonance circuit allows the load capacitance to be charged and discharged with only a minimum power loss. The only power losses incurred in the inverter 200 are due to characteristics of inverter components including the ESR of the inductor and due to series resistance of each of the switches when in the on state. Thus, inverters in accordance with embodiments of the present invention, do not require bulky heat sinks like inverters of the prior art, and are more efficient than inverters of the prior art. The improved efficiency of inverters in accordance with embodiments of the present invention make them particularly desirable for use in uninterruptible power supplies, wherein they can extend the operating time of a UPS in battery mode, reduce the size and weight of the UPS and reduce electromagnetic emissions from the UPS.

Figure 1:
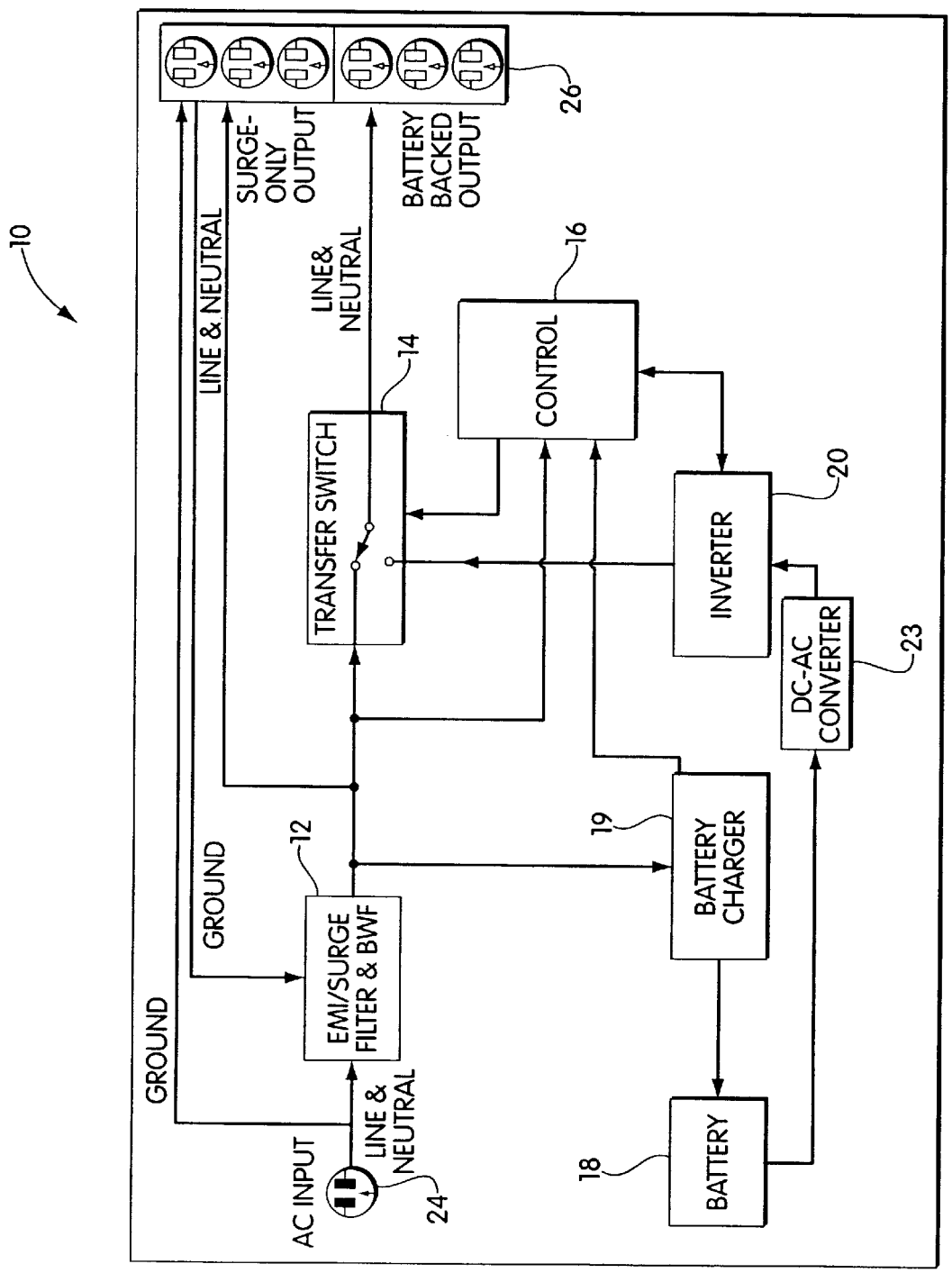
FIG. 1 is a block diagram of a typical uninterruptible power supply.
Figure 2:
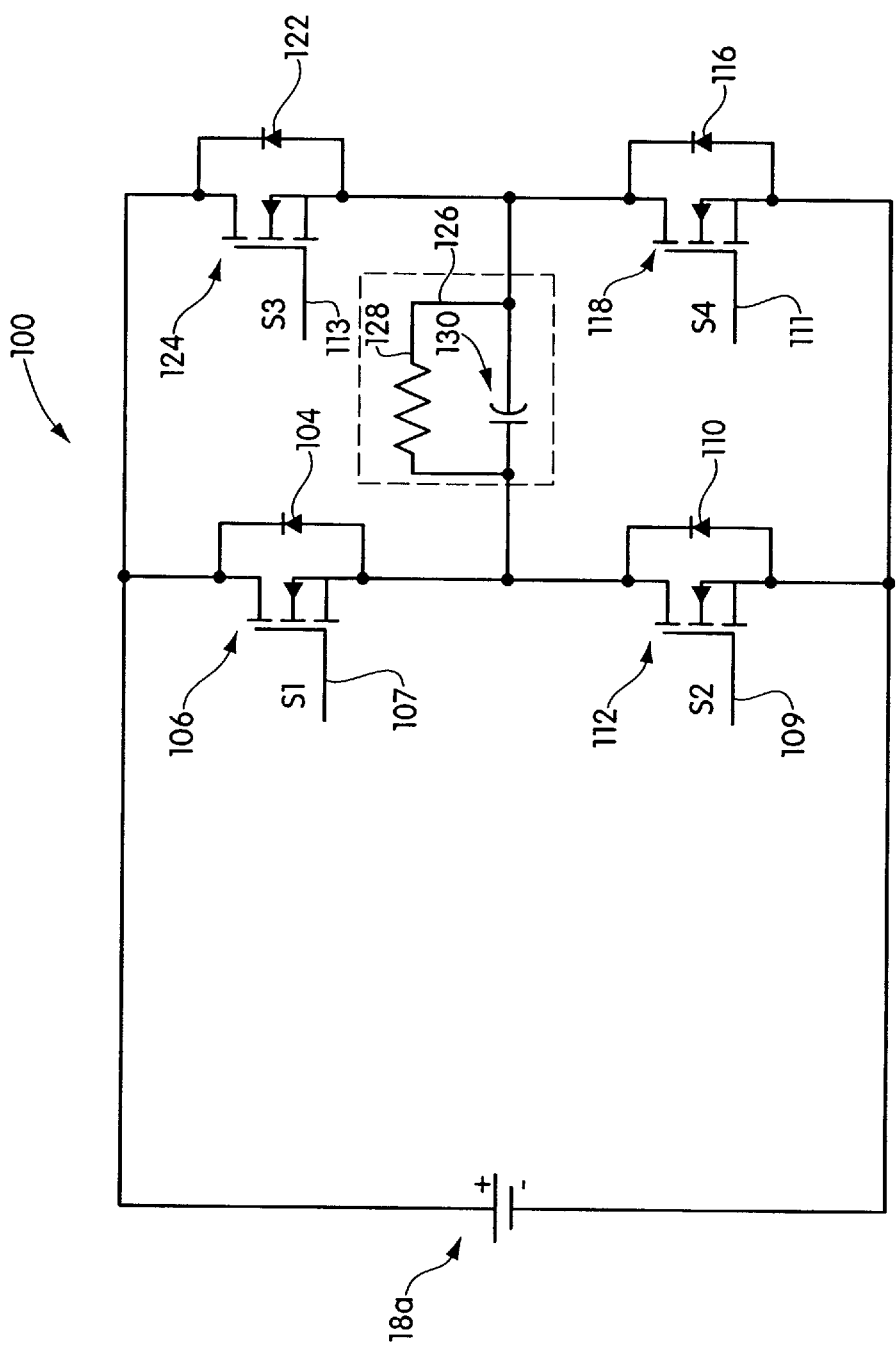
FIG. 2 shows a schematic diagram of a typical prior art inverter circuit.
Figure 2A:
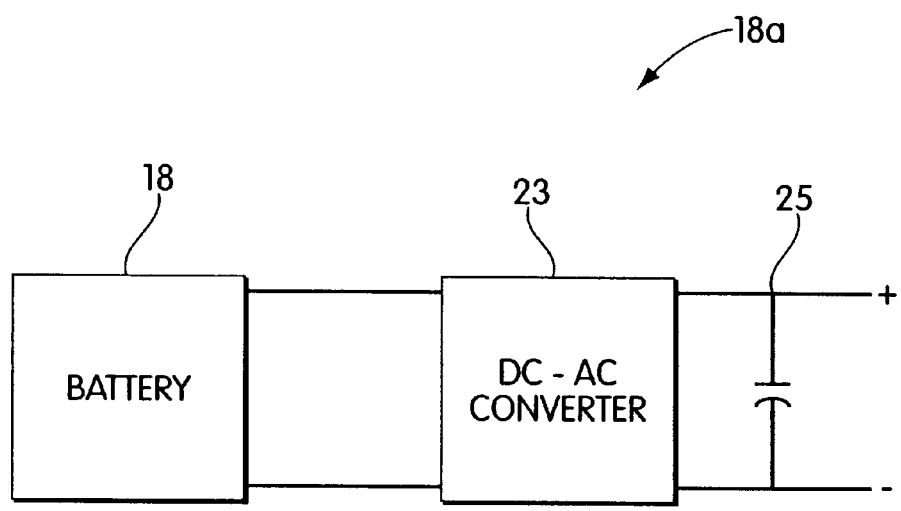
FIG. 2A shows a block diagram of a voltage source used with the inverter circuit of FIG. 2.
Figure 3:
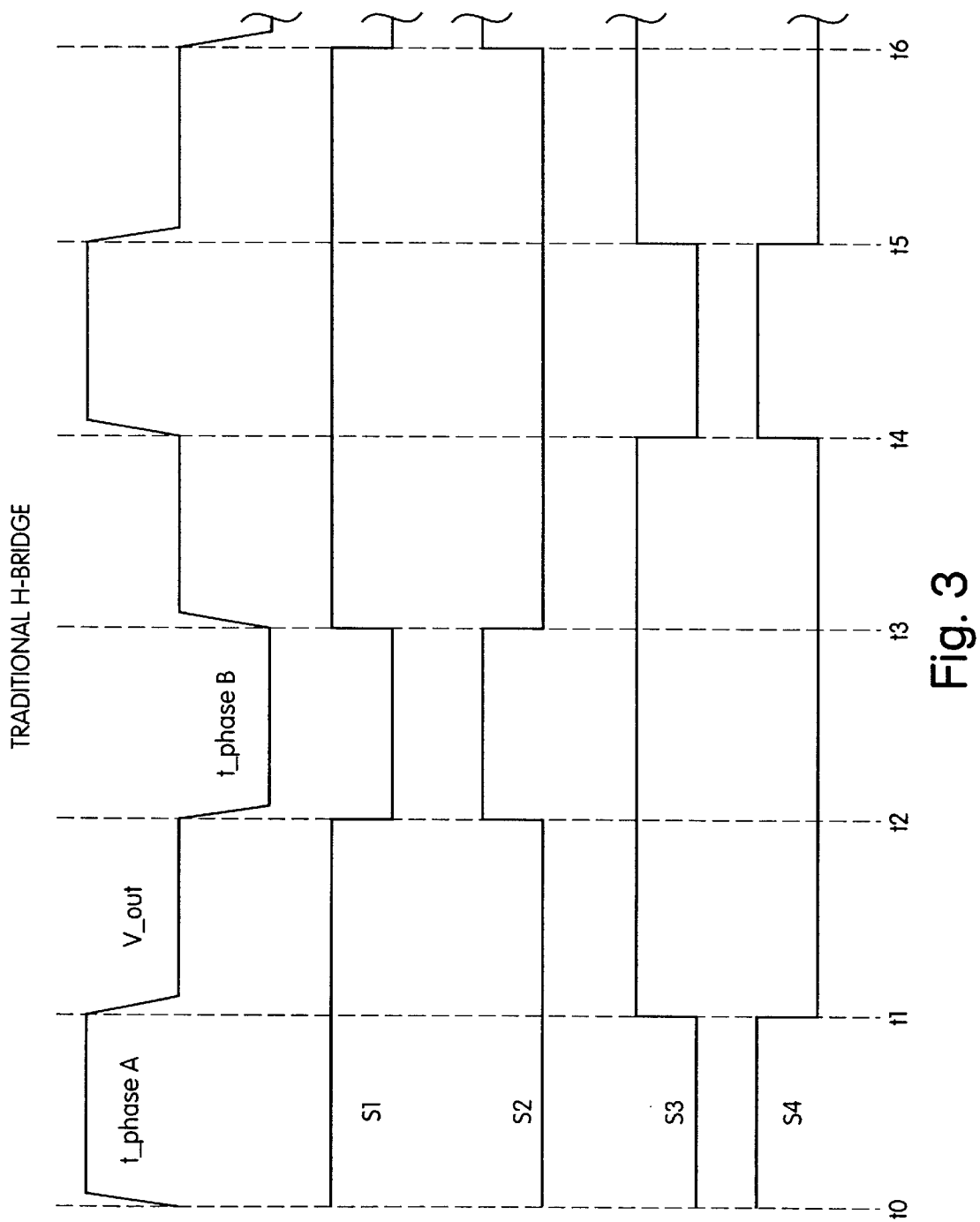
FIG. 3 shows timing waveforms for the inverter circuit shown in FIG. 2.

In embodiments of the present invention described above, inverters are described as being used with uninterruptible power supplies, for example, in place of the inverter 20 in the UPS 10 of FIG. 1. As understood by those skilled in the art, inverters of the present invention may also be used with other types of uninterruptible power supplies. For example, the inverters may be used with UPSs in which an input AC voltage is converted to a DC voltage and one of the converted DC voltage and a DC voltage provided from a battery-powered DC voltage source is provided to an input of the inverter to create the AC output voltage of the UPS. In addition, as understood by those skilled in the art, inverters in accordance with embodiments of the present invention may also be used in systems and devices other than uninterruptible power supplies.

In the inverter 200 described above, MOSFET devices are used as the switches S1–S6. As understood by those skilled in the art, a number of other electrical or mechanical switches, such as IGBT's with integral rectifiers, or bipolar transistors having a diode across the C-E junction, may be used to provide the functionality of the switches. Further, in embodiments of the present invention, each of the switches S1–S6 need not be implemented using the same type of switch.

In embodiments of the invention discussed above, an inductor is used as a resonant element in inverter circuits. As understood by one skilled in the art, other devices having a complex impedance may be used in place of the inductor, however, it is desirable that any such device be primarily inductive in nature.

In the embodiments of the present invention described above, energy is returned from the inductor to the voltage source after the load capacitance has been discharged. As understood by those skilled in the art, the voltage source may include a battery that receives the energy from the inductor, or the voltage source may include a storage device other than a battery, such as a capacitor, coupled in parallel across the voltage source that receives the energy.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. An uninterruptible power supply for providing AC power to a load having a capacitive element, the uninterruptible power supply comprising:
   an input to receive AC power from an AC power source;
   an output that provides AC power;
   a DC voltage source that provides DC power, the DC voltage source having an energy storage device;
   an inverter operatively coupled to the DC voltage source to receive DC power and to provide AC power, the inverter including:
      first and second output nodes to provide AC power to the load having the capacitive element;
      first and second input nodes to receive DC power from the DC voltage source;
      a resonant element having a first terminal and a second terminal, the second terminal being electrically coupled to the first output node;
      a first switch electrically coupled between the first terminal of the resonant element and the first input node, wherein during a first time period, the first switch is selected to enable an electrical current path from the resonant element to the capacitive element, an electrical current of the path storing energy in the resonant element and charging the capacitive element to a first voltage level, and during a second time period, the first switch is selected to block the electrical current path to cause the stored energy in the resonant element to further charge the capacitive element to a second voltage level during the second time period;
      a set of switches operatively coupled between the first and second output nodes and the first and second input nodes and controlled to generate AC power from the DC power; and
   a transfer switch constructed and arranged to select one of the AC power source and the DC voltage source as an output power source for the uninterruptible power supply.

2. The uninterruptible power supply of claim 1, wherein the first voltage level is a portion of a voltage source and the second voltage level is substantially the voltage source.

3. The uninterruptible power supply of claim 1, wherein the set of switches includes:
   a second switch electrically coupled between the second output node and the second input node;
   a third switch electrically coupled between the second output node and the first input node;
   a fourth switch electrically coupled between the first output node and the first input node; and
   a fifth switch electrically coupled between the first output node and the second input node.

4. The uninterruptible power supply of claim 3, wherein the inverter further includes:
   a sixth switch electrically coupled between the first terminal of the resonant element and the second input node.

5. The uninterruptible power supply of claim 4, wherein the resonant element includes an inductor.

6. The uninterruptible power supply of claim 5, wherein each of the switches includes a transistor.

7. The uninterruptible power supply of claim 6, wherein the energy storage device includes a battery.

8. The uninterruptible power supply of claim 7, wherein the transfer switch is constructed and arranged to receive the AC power from the input and to receive the AC power from the inverter and to provide one of the AC power from the input and the AC power from the inverter to the load.

9. The uninterruptible power supply of claim 1, wherein the resonant element includes an inductor.

10. The uninterruptible power supply of claim 1, wherein each of the switches includes a transistor.

11. The uninterruptible power supply of claim 1, wherein the energy storage device includes a battery.

12. The uninterruptible power supply of claim 1, wherein the transfer switch is constructed and arranged to receive the AC power from the input and to receive the AC power from the inverter and to provide one of the AC power from the input and the AC power from the output of the inverter to the load.

13. An uninterruptible power supply for providing AC power to a load having a capacitive element, the uninterruptible power supply comprising:
   an input to receive AC power from an AC power source;
   an output that provides AC power;
   a voltage source that provides DC power, the voltage source having an energy storage device;
   an inverter operatively coupled to the voltage source to receive DC power and having an output to provide AC power, the inverter including:
      means for charging the capacitive element to a first voltage level by creating an electrical current path from the inverter to the load through a resonant element, wherein the resonant element stores energy from an electrical current of the path;
      means for blocking the electrical current path after the capacitive element has been charged to the first voltage level to cause energy from the resonant element to be transferred to the capacitive element to further charge the capacitive element to a second voltage level; and
   a transfer switch constructed and arranged to select one of the AC power source and the voltage source as an output power source for the uninterruptible power supply.

14. The uninterruptible power supply of claim 13, wherein the energy storage device includes a battery.

15. The uninterruptible power supply of claim 14, wherein the resonant element includes an inductor.

16. The uninterruptible power supply of claim 15, wherein the transfer switch is constructed and arranged to receive the AC power from the input and to receive the AC power from the output of the inverter and to provide one of the AC power from the input and the AC power from the output of the inverter to the load.

17. The uninterruptible power supply of claim 13, wherein the resonant element includes an inductor.

18. The uninterruptible power supply of claim 13, wherein the transfer switch is constructed and arranged to receive the AC power from the input and to receive the AC power from the output of the inverter and to provide one of the AC power from the input and the AC power from the output of the inverter to the load.

19. A method of supplying an uninterruptible AC voltage to a load having a capacitive element using an uninterruptible power supply having a DC voltage source with an energy storage device, the method comprising steps of:

charging the capacitive element to a first voltage level by supplying electrical current from the DC voltage source to the load through a resonant element in the uninterruptible power supply, storing energy in the resonant element from the electrical current;

blocking the electrical current from the DC voltage source to the load through the resonant element after the capacitive element has been charged to the first voltage level; and transferring the stored energy from the resonant element to the capacitive element to further charge the capacitive element to a second voltage level.

20. The method of claim 19, further comprising steps of:

supplying load current from the DC voltage source to the load after the capacitive element has been charged to the second voltage level;

blocking the load current from the DC voltage to the load after a predetermined period;

discharging the capacitive element through the resonant element; and transferring energy from the resonant element to the energy storage device in the DC voltage source.

21. The method of claim 19, further comprising steps of:

receiving an AC voltage from an AC power source;

selecting one of the AC power source and the DC voltage source as an output power source for the uninterruptible power supply.

22. The method of claim 19, wherein the resonant element includes an inductor.

* * * * *